United States Patent [19]

Guile

[11] 3,973,217

[45] Aug. 3, 1976

[54] AERODYNAMIC WINDOW ALTITUDE CONTROL

[75] Inventor: Roy N. Guile, Wethersfield, Conn.

[73] Assignee: United Technologies Corporation, Hartford, Conn.

[22] Filed: Aug. 28, 1975

[21] Appl. No.: 608,822

[52] U.S. Cl. .................... 331/94.5 C; 331/94.5 D; 330/4.3; 350/319
[51] Int. Cl.² ..................... H01S 3/22; G02B 5/00
[58] Field of Search ............... 331/94.5 PE, 94.5 G, 331/94.5 D, 94.5 C; 330/4.3; 350/319

[56] References Cited
UNITED STATES PATENTS
3,907,409  9/1975  Hausmann ..................... 350/319

*Primary Examiner*—Robert J. Webster
*Attorney, Agent, or Firm*—Jack N. McCarthy

[57] ABSTRACT

A gas laser emits an output laser beam from a low pressure region to a region having a higher pressure. This is done through an opening in the side of a laser device. Under normal circumstances, the provision of such an opening would incur a flow of air from the high pressure side, externally of the laser device, to the low pressure side within the device. To prevent this, an aerodynamic window is placed in a passageway leading from said opening in the laser device through which the laser beam passes. A gas flow is passed across said passageway which will provide a flow segment having a pressure differential across the segment which is equal to that between the low and high pressure regions. When such an aerodynamic window is used in an aircraft and the aircraft experiences changes in altitude, the pressure differential across the flow segment changes. By using a multi-element nozzle array to provide the aerodynamic window flow, where each element of the array contains its own supply valve, changes in pressure differential are accommodated by throttling the individual elements.

3 Claims, 5 Drawing Figures

Fig. 5 TYPICAL SCHEDULE FOR CLOSING NOZZLE VALVES
$\delta s = 4$ deg.

| A | B | C | D | E | F |
|---|---|---|---|---|---|
| NOZZLE (FIG.2) | NOZZLE MACH NO. | NOZZLE EXIT PRESSURE atm | PRESSURE RATIO FOR $\delta = \delta s$. P/Pamb | ALTITUDE PRESSURE atm | ALTITUDE AT WHICH NOZZLE VALVE IS CLOSED |
| N1 | 2.32 | .775 | — | — | — |
| N2 | 2.73 | .410 | .747 | .549 | CLOSE V1 AT 4800 METERS |
| N3 | 3.25 | .188 | .711 | .264 | CLOSE V2 AT 9900 METERS |
| N4 | 4.02 | .064 | .638 | .100 | CLOSE V3 AT 16,200 METERS |

AERODYNAMIC WINDOW ALTITUDE CONTROL

BACKGROUND OF THE INVENTION

This invention relates to aerodynamic windows in general and is shown in combination with a gas laser. In lasers of low power, windows with physical walls made of materials which transmit the laser wavelength have been used, but subject window is for use when the laser beam will distort or disintegrate physical window materials. Other aerodynamic windows of this type are set forth below: U.S. Pat. Nos. 3,604,789; 3,617,928; 3,654,569 and 3,873,939.

SUMMARY OF THE INVENTION

A primary object of this invention is to provide a means and method by which an aerodynamic window may be operated in an environment which is characterized by changes in ambient pressure. Such an environment exists, for example, in an aircraft operating over a range of altitude.

The method of operation utilizes an aerodynamic window having a supply nozzle array to produce a flow field which serves to prevent or minimize flow between two regions of different pressure. The individual nozzles of said supply nozzle array possess individually controllable supply valves. These supply valves can be actuated by an altitude pressure to achieve the desired sequential operation of the valves.

A purpose of this invention is to prevent disruption of the environment interior to the aircraft which might occur due to failure of the aerodynamic window exhaust diffuser to capture the flow exiting from said aerodynamic window nozzle as changes in ambient pressure occur.

A further object of this invention is to provide a means for reducing the gas supply mass flow supplied to an aerodynamic window as the pressure differential across the aerodynamic window is reduced by a decrease in ambient pressure.

BRIEF DESCRIPTION OF THE DRAWINGS

FIG. 5 is a table showing a typical schedule for operation of aerodynamic window supply valves to compensate for altitude effects.

DESCRIPTION OF THE PREFERRED EMBODIMENT

Figure 1:
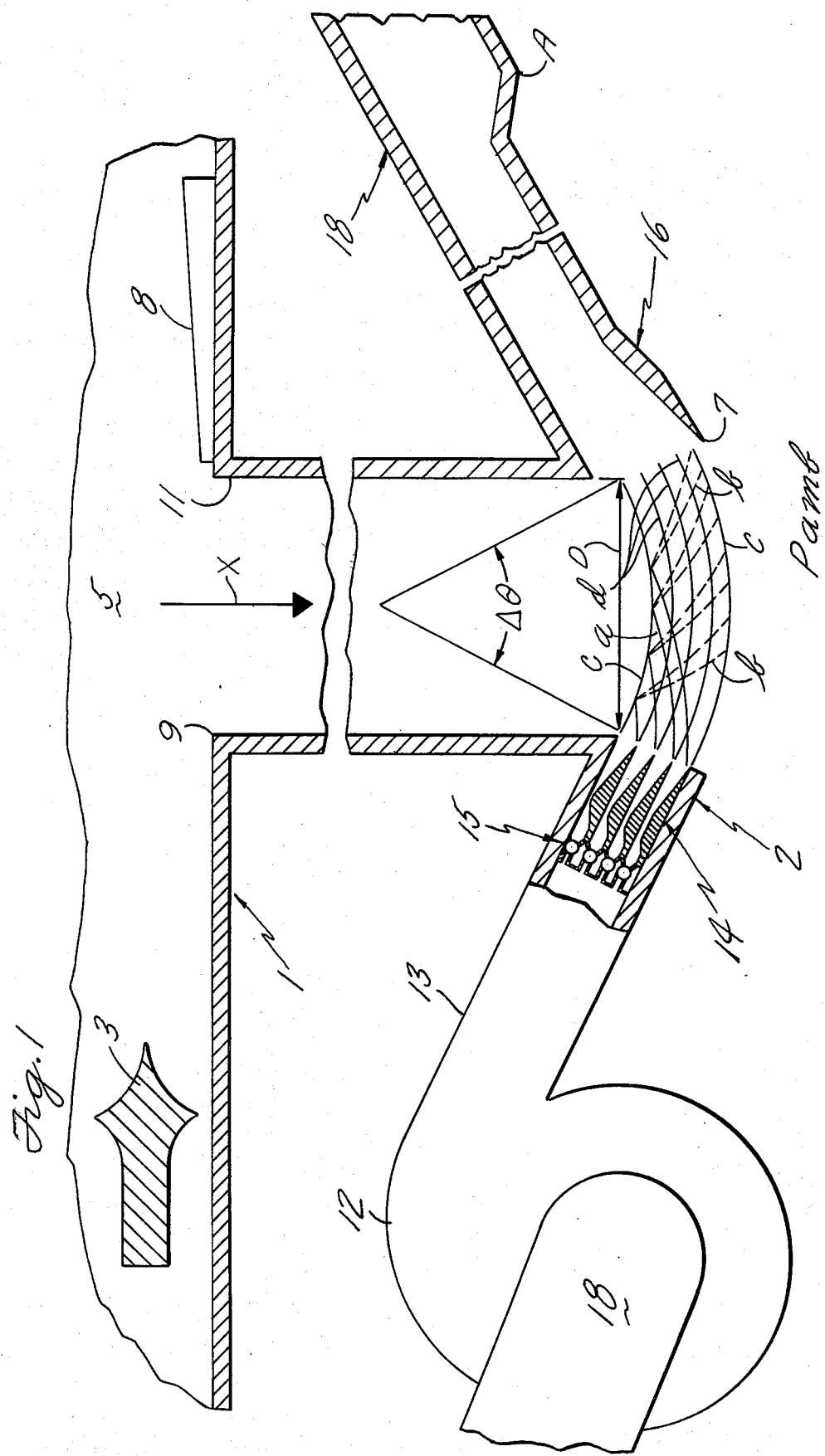
FIG. 1 is a view of the aerodynamic window as shown in relation to a laser device.

A gas dynamic laser 1 comprises a nozzle means 3, a laser cavity 5 and a diffuser section not shown. A similar nozzle means is disclosed in U.S. Pat. No. 3,602,432. More information on a laser construction can be found in the patents referred to above and much other prior art. The laser beam X formed in the cavity 5 is directed through an opening 9 in the side of the laser. A mirror 8 is part of the optical system which directs the beam X through the opening 9. A passageway 11 extends downwardly from and around the opening 9 through which the laser beam X passes from the cavity. A centrifugal aerodynamic window 2 is provided which is fixedly connected to the passageway 11 to form an aerodynamic boundary across said passageway so that the difference in pressure between that in the cavity 5 of the laser 1 and the pressure externally of the laser is prevented from equalizing.

The aerodynamic window 2 includes a conduit 13 connected to the side of the passageway 11 through which a gas under pressure is directed across the passageway. This gas flow is received in an opening 7 on the opposite side of the passageway. A multi-element nozzle array 14 is located in conduit 13 and directs its flow therethrough into passageway 11 so as to enter opening 7. A pump 12 connected to conduit 13 supplies high pressure air, or other gas, to the nozzle array through said conduit 13. Each of the nozzles of the array 14 is connected to the supply of conduit 13 by a control valve of the valve bank 15. Opening 7 provides an entrance to a diffuser 16 which extends from the opening 7 to the point A (see FIG. 1). This diffuser 16 serves to capture the flow exiting the nozzle array 14 and increases the static pressure of the flow either to permit the flow to be exhausted to the atmosphere in an open loop system or reducing the requirements of the pump 12 in a closed loop system, such as that shown in FIG. 1. The diffuser 16 empties into a duct 18 which in turn directs the flow back into an inlet opening in the pump 12. This provides a closed loop system which will conserve aerodynamic window gas.

The aerodynamic window of FIG. 1 uses a nozzle array 14 to produce a flow across passageway 11 which approximates the flow field of a segment of free vortex. A nozzle of this type is described in U.S. Pat. No. 3,873,939. The flow exiting the nozzle is characterized by the interactions of shock waves, $a$, and expansion fans, $b$, with the flow boundaries, $c$. Such interactions provide the flow turning as the jet spans the passageway. The nozzle wakes $d$ arise from the presence of the various nozzles of the array.

Figure 2:
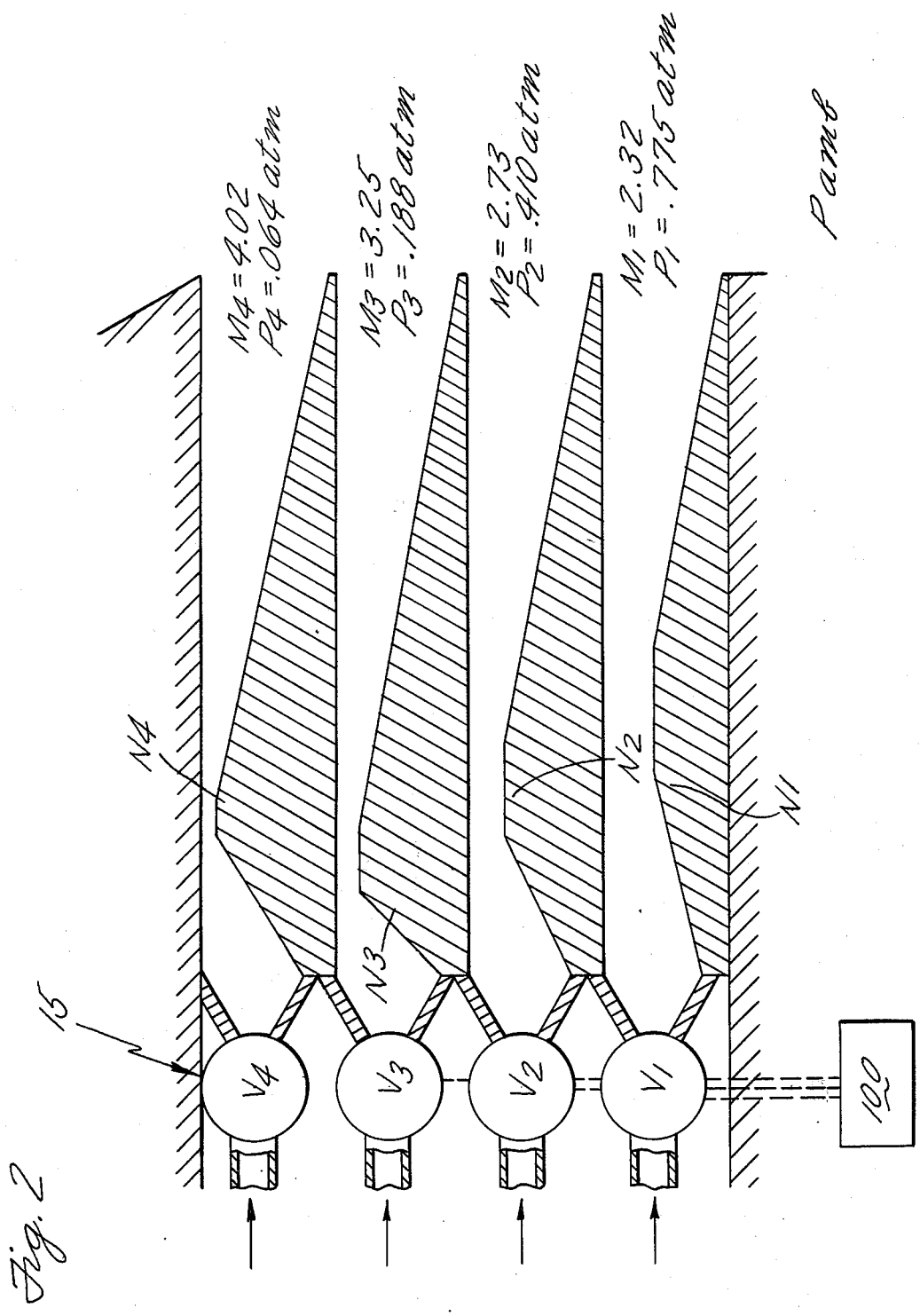
FIG. 2 is an enlarged view of a multi-element nozzle array having individual supply valves.

As shown in FIGS. 1 and 2, each of the nozzles of the array 14 is fed through a supply valve of the valve bank 15. In FIG. 2 the nozzles of the array 14 are designated N1, N2 N3 and N4 and their respective supply valves of the valve bank 15 are $V_1$, $V_2$, $V_3$ and $V_4$. The function of the valves is to provide individual control of the supply flow to the nozzles comprising the array 14.

In the absence of valves controlling the supply to the nozzles, a decrease in the ambient pressure adjacent to the exit of the nozzle array 14 results in a tendency for the flow exiting the nozzles to expand into the environment as the aerodynamic window flow adjusts to the reduced ambient pressure. This process is indicated by the expansion fan $b_1$ in FIG. 3. Such an expansion would cause the flow boundaries $c$ to deflect and might cause a portion of the flow to avoid capture at the opening 7 to the diffuser 16. In this event, that portion of the flow not captured is lost to the flow system and added to the environment. For an aerodynamic window operated in an aircraft, the drop in ambient pressure accompanying an increase in aircraft altitude could result in the undesirable spillage of aerodynamic window flow into the aircraft cabin.

Figure 4:
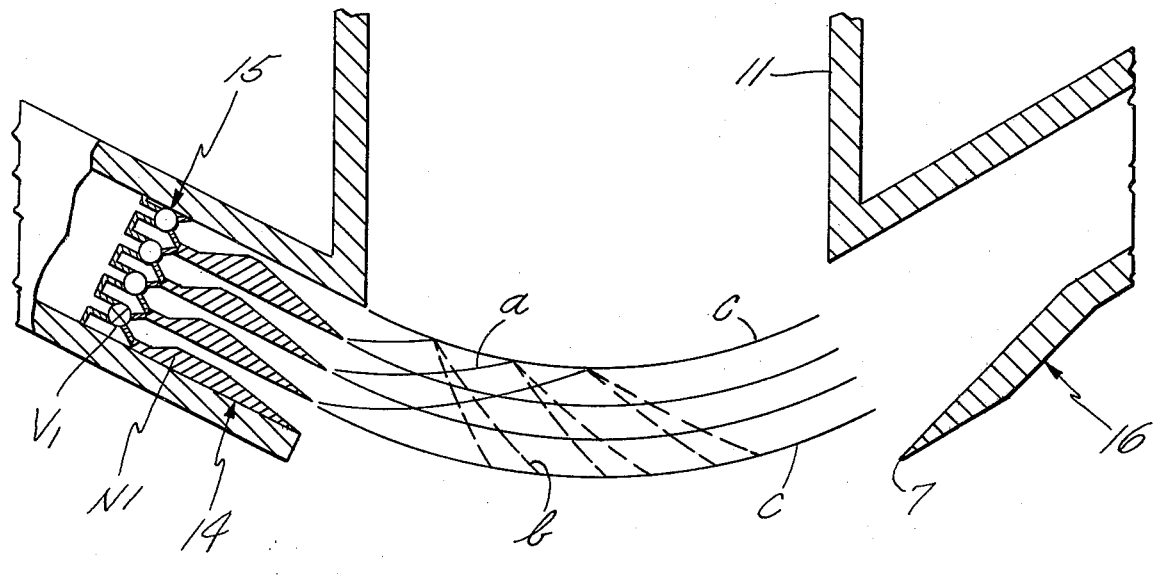
FIG. 4 is a drawing illustrating aerodynamic window operation when the effects of altitude have been compensated.

The addition of the valves permits control of the flow to the nozzles so that, in the event of a decrease in ambient pressure for the reasons set forth above, a portion of the flow across the passageway 11 may be occluded. In this manner, as shown in FIG. 4, valve $V_1$ supplying nozzle N1 is closed to compensate for the decrease in ambient pressure. The entire nozzle effluent is then captured at the opening 7 to the diffuser and no aerodynamic window gas is expelled into the aircraft cabin.

The method for controlling the flow using the valves is made possible by the nature of the flow exiting the nozzles. Each of the nozzles of the nozzle array 14 produces a flow having a pressure differing from that of the adjacent nozzle. A representative set of pressures for the individual nozzles is given on FIG. 2. Pressure $P_1$ of nozzle N1 is greater than pressure $P_2$ of nozzle N2, and so on. In this example, the pressure variation corresponds to an approximation of a free vortex as described in U.S. Pat. No. 3,873,939. When the ambient pressure decreases to a level below $P_1$ of nozzle N1 there comes a level when the flow of nozzle N1 at pressure $P_1$ is not needed and may be undesirable in that the flow is no longer fully captured at the opening 7. Valve $V_1$ is thus closed when the relationship between the flow exiting the nozzle N2 and the lower ambient pressure is like the original relationship between the flow exiting the nozzle N1 and the higher initial ambient pressure at sea level.

Figure 3:
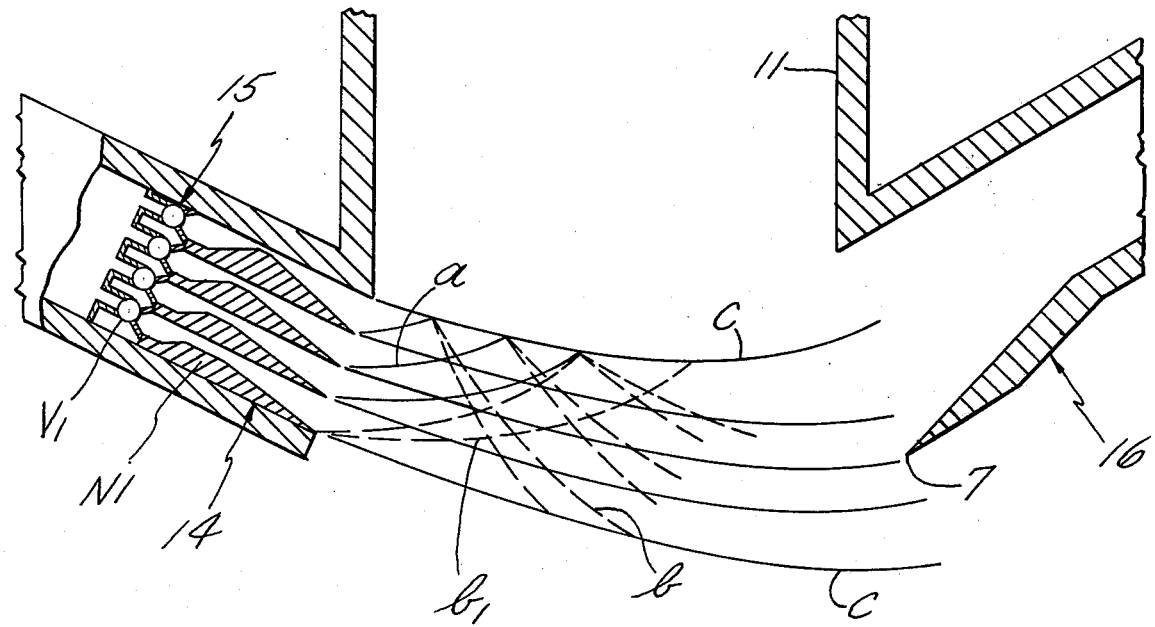
FIG. 3 is a drawing illustrating aerodynamic window operation when the effects of altitude have not been compensated.

The method for selecting the altitude at which flow to the individual nozzles of the array 14 may be terminated using the valves is set forth here with reference to FIG. 2. At the sea level condition, the pressure ratio $P_{amb}/P_1$ between the environment and the exhaust flow of nozzle N1 in combination with the Mach number of nozzle N1 determines the strength of the shock wave $a$ (FIG. 1). The strength of this shock at this sea level condition may be represented by the attendant flow deflection angle $\delta_S$ which is the angle through which the flow exiting the nozzle is deflected due to the pressure differential. As the ambient pressure decreases with increasing altitude, the pressure differential is reduced and the actual deflection angle, $\delta_D$, decreases below $\delta_S$. The decreased deflection tends to cause the aerodynamic window flow to deflect outward towards the ambient side to cause spillage at the opening 7 to the diffuser. The shock, which accompanies this flow deflection, eventually vanishes as the ambient pressure drops to equal the pressure of the flow at the nozzle exit. Further reductions in ambient pressure will cause an expansion fan to form at the nozzle exit. As seen in FIG. 3, this expansion fan, $b_1$, enhances the outward deflection of the flow boundary on the ambient side of the aerodynamic window flow increasing the spillage of flow at the opening 7 to the diffuser. To avoid spillage of the aerodynamic window flow into the lower pressure environment, the flow to outer nozzle N1 may be terminated by closing valve $V_1$ when the pressure ratio, $P_{amb}/P_2$, of ambient pressure (the new, lower value) to the pressure at the exit of nozzle N2, is such that the flow deflection angle at the exhaust of nozzle N2 is equal to or less than the angle $\delta_S$ described above.

The opening 7 to the diffuser captures the aerodynamic window flow including in the interim when the ambient pressure drops but before flow to the outer nozzle has been terminated in order to avoid spillage into the aircraft. The size of the opening sufficient to capture the flow during this interim will depend upon the aerodynamic window design conditions (Mach numbers, supply pressure, number of nozzle elements). A greater number of nozzle elements would afford finer control of the altitude compensation technique and reduce the size of the diffuser opening necessary to capture the flow in the interim between the shutdown of adjacent valves.

In the example of FIG. 2, the Mach numbers of the individual nozzles are as shown in column B of FIG. 5. For a supply pressure of 10 atm the pressure at the exit of each nozzle is given in column C of FIG. 5. For these conditions, the deflection angle, $\delta_S$, for nozzle N1 at sea level is 4 degrees. The pressure ratios between the ambient and each of the nozzle exit planes which would result in the same 4° deflection angle for each of the remaining nozzles are tabulated in column D. Dividing column C by column D, the ambient pressure at which the flow to each of the nozzles may be terminated is given by column E. For example, when the ambient pressure is 0.549 atm, termination of the flow to nozzle N1 would result in a deflection angle of 4° at the exit of nozzle N2. These pressures given in column E, therefore, correspond to the altitudes shown in column F at which the valve supplying the adjacent nozzle may be closed if a maximum deflection angle of 4° is to be maintained.

The procedure described above was used to determine a schedule for terminating the flow to elements of the nozzle array as altitude changes. This procedure is based on maintaining a specified maximum deflection angle at the exit plane of the nozzle on the ambient side of the aerodynamic window. While the procedure used is of general applicability, this particular schedule (FIG. 5, column E) applies only to the conditions of the present example as given in FIG. 2. As shown in FIG. 2, a control device 100 can be used to actuate the valves $V_1$, $V_2$ and $V_3$ automatically in a manner to provide a proper scheduling for closing and opening of the valves. The control device 100 can have pressure actuated switches suitable for controlling motors which actuate each of the valves $V_1$, $V_2$ and $V_3$. In the example set forth above, the pressures which are used to control valves $V_1$, $V_2$ and $V_3$ are set forth in column E of FIG. 5. A different schedule would be used for any of the following reasons: an aerodynamic window having a different number of nozzle elements (a greater number would afford finer control), a different supply pressure, or a nozzle Mach number distribution other than that approximating a free vortex. Further if a different limiting flow deflection angle $\delta_S$, were used, the schedule would be modified. A practical upper limit on the angle $\delta_S$ would be the angle which causes boundary layer separation within the nozzle. Typically, this limiting angle is approximately 10°–13°.

I claim:
1. A method of operating an aerodynamic window in an opening between low and high gas pressure regions wherein the pressure of at least one of these regions is variable comprising
   1. forming a gas flow which will have a pressure differential thereacross which is approximately equal to that between the low and high pressure regions,
      a. forming said gas flow so that it comprises a plurality of separate gas flows between said two regions,
   2. directing the plurality of separate gas flows from one side of said opening between said low and high gas pressure regions,
   3. collecting the plurality of separate gas flows on the other side of said opening,
   4. varying the pressure of one of said gas pressure regions,

5. controlling each of the flows of said plurality of separate gas flows to compensate for the effects of variations of the pressure in said varied pressure region so that the separate gas flows have as much of their flow as possible collected on the other side of said opening.

2. A method as set forth in claim 1 wherein the flows of said plurality of gas flows are closed from the high pressure region inwardly toward the low pressure region as the pressure in the high pressure region is reduced.

3. A method as set forth in claim 1 wherein the flows of said plurality of gas flows are closed from the low pressure region inwardly toward the high pressure region as the pressure in the low pressure region is increased.

* * * * *